Figure 3:
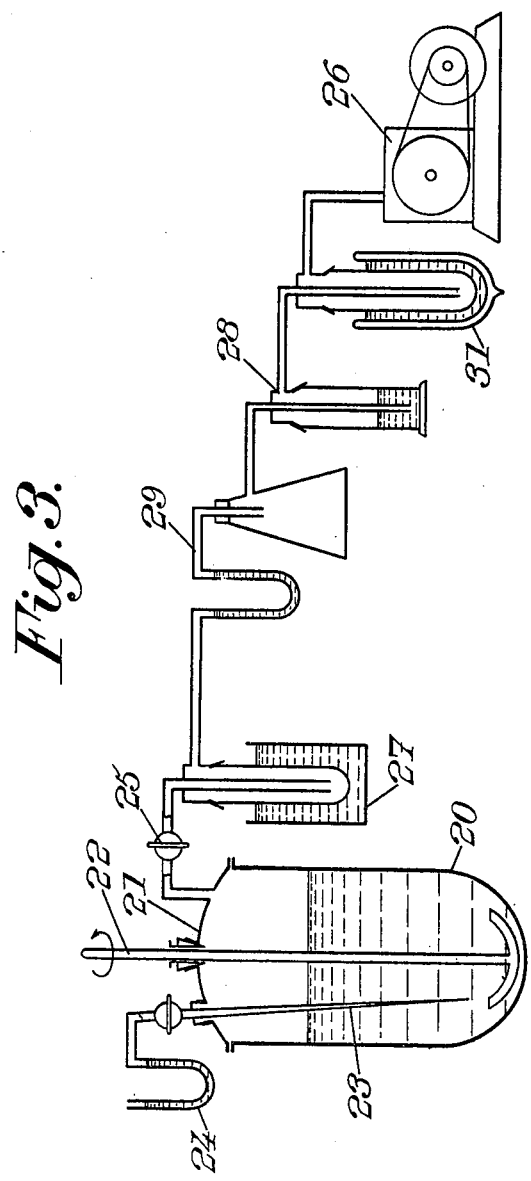

United States Patent [19]
Teichner et al.

[11] 3,956,475
[45] May 11, 1976

[54] METHOD FOR THE PREPARATION OF COPPER HYDROXIDE AND OF A CATALYST OBTAINED FROM THIS HYDROXIDE

[75] Inventors: Stanislas Teichner, Villeurbanne; Bernard Echevin, La-Chambre, both of France

[73] Assignee: Agence Nationale de Valorisation de la Recherche (ANVAR), Neuilly-sur-Seine, France

[22] Filed: Dec. 21, 1973

[21] Appl. No.: 377,295

[52] U.S. Cl. .............................. 423/604; 252/476
[51] Int. Cl.² ...................... C01G 3/02; B01J 23/72
[58] Field of Search .................. 423/548, 593, 604; 252/476

[56] References Cited
UNITED STATES PATENTS

| | | | |
|---|---|---|---|
| 1,100,518 | 6/1914 | Borzykowski | 423/604 |
| 1,800,828 | 4/1931 | Furness | 423/604 |
| 1,867,357 | 7/1932 | Furness | 423/604 |
| 3,635,668 | 1/1972 | Barker | 423/604 |
| 3,701,739 | 10/1972 | Bovarnick | 252/476 |

OTHER PUBLICATIONS

Hackh's Chemical Dictionary, p. 778, Edited by J. Grant, The Blakiston Company, Inc., N.Y., N.Y., 1953.

Primary Examiner—Oscar R. Vertiz
Assistant Examiner—Gary P. Straub
Attorney, Agent, or Firm—Larson, Taylor and Hinds

[57] ABSTRACT

The invention produces a catalyst of highly divided metallic copper on a support. The copper hydroxide is prepared in an organic medium by means of a soluble complex of copper hydroxide decomposable under the effect of a physical agent and this catalyst is prepared directly from this complex. It is useful in catalytic reactions for dehydrogenation of butanol and of isopropanol.

7 Claims, 3 Drawing Figures

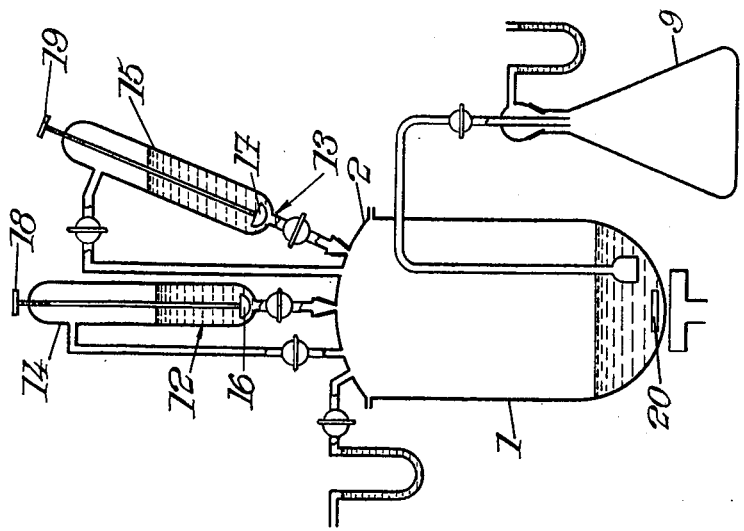
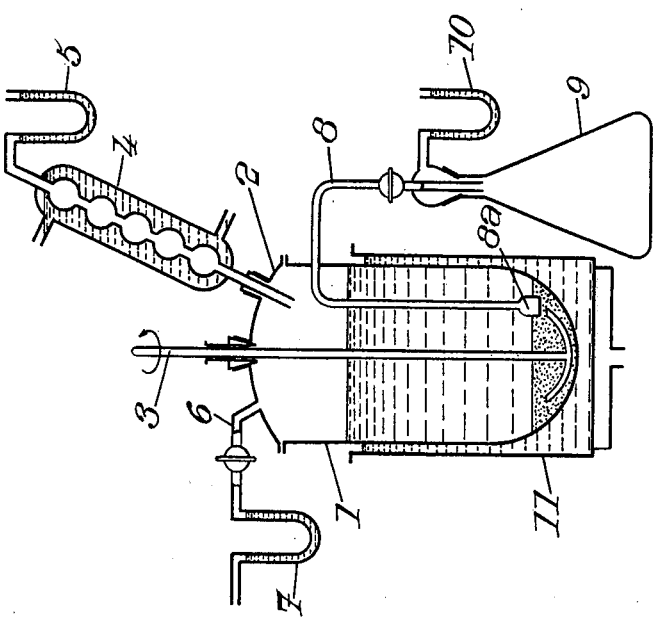

METHOD FOR THE PREPARATION OF COPPER HYDROXIDE AND OF A CATALYST OBTAINED FROM THIS HYDROXIDE

The invention relates to a method for the preparation of copper hydroxide and to a catalyst obtained from this hydroxide.

It is known that finely divided metallic copper on an inert support constitutes a catalyst of remarkable selectivity.

It is also known that it is possible to prepare such catalyst by the method of direct impregnation by preparing a suspension of the inert support in a solution of a salt of copper such as the nitrate. By pyrolysis and by reduction, catalytic copper is obtained on the support.

Known methods for doing this, have the drawback of not allowing copper hydroxide to be obtained, which constitutes a particularly desirable intermediate product for the obtaining of the subsequent divided copper, and a catalyst at the same time sufficiently free of impurities and of satisfactory texture.

It is an object of the invention to overcome this drawback and to provide a method enabling not only the obtaining of copper hydroxide and a corresponding catalyst responding better to the various desiderata of practice than those existing hitherto, but also of conferring on the copper a highly dispersed state, hence a remarkably high catalytic activity.

The method according to the invention for the preparation of copper hydroxide is characterised by the fact that in the midst of an organic liquid medium, adapted to dissolve at least one mineral compound of the copper and at least one base, there is first of all made to react such a compound with a complexing agent for the copper selected from among those which are capable of giving rise to the formation of a complex of copper hydroxide decomposable under the effect of a physical agent thereby providing the desired copper hydroxide, there is then introduced into the reaction medium one of the abovesaid bases and finally after elimination of the insolubles, by application of the abovesaid physical agent, the complex of copper hydroxide formed is decomposed.

According to a preferred embodiment of the abovesaid method a salt of copper such as the sulphate and ammonia are dissolved in a solvent such as methanol, the product of the reaction is taken up by a methanol solution of soda, the precipitate of $Na_2SO_4$ is separated and the ammonia is driven from the soluble comples of copper hydroxide tetra-ammoniakate by boiling under reduced pressure.

To obtain the catalyst constituted by metallic copper dispersed on the inert support, the last step of the method according to the invention is effected in the presence of a dispersion of the abovesaid inert support in the reaction medium.

Apart from the abovesaid features, the invention relates also to a certain number of other features which are preferably used at the same time and which will be more explicitly discussed below.

It will in any case be well understood by means of the additional description which follows and of the accompanying drawings, which description and drawings are given with respect to a preferred embodiment of the invention, and are not to be regarded as limiting.

FIGS. 1 to 3 of these drawings show in diagrammatic section, three experimental devices used for the application of the method according to the invention.

According to the invention and more especially according to those types of application as well as according to those embodiments of its various parts to which it would appear that preference should be given, in order to prepare the copper hydroxide and, by means of this hydroxide, a catalyst, procedure is as follows or in analogous manner.

In the midst of an organic liquid medium, adapted to dissolve at least one mineral compound of copper and at least one base, there is first of all made to react such a compound with a complexing agent for copper selected from among those which are capable of giving rise to a copper hydroxide complex decomposable under the effect of a physical agent thereby supplying the desired copper hydroxide, there is then introduced into the reaction medium one of the abovesaid bases and finally, after removal of the insolubles, the complex of copper hydroxide formed is decomposed by the application of the abovesaid physical agent.

Good results have been obtained by selecting as the organic liquid medium, a lower alkanol solvent such as methanol, as mineral compound of copper, an inorganic salt e.g. cupric sulphate as complexing agent ammonia and as base an alkali metal hydroxide e.g. potash or soda.

Consequently, a methanol solution of copper sulphate is treated by a methylic ammoniacal solution leading to the obtaining of a copper sulphate tetra-ammoniakate insoluble in methanol.

The insoluble precipitate of copper sulphate tetra-ammoniakate is placed in contact with a methanol solution of soda in stoechiometric conditions, which give rise to the formation of soluble cupritetrammoniakate hydroxide and sodium sulphate, insoluble in methanol, which is separated therefrom. The cupritetrammoniakate hydroxide solution is subjected to decomposition under reduced pressure which leads finally to the solid copper hydroxide. Taking into account particular conditions imposed by the solubilities of the reactants of the base and of the complexant in the selected organic medium, there can also be used other lower aliphatic alcohols, such as ethyl alcohol and to a lesser extent propyl alcohol.

The preparation of the solvent and of the reactants imposes the observance of a certain number of precautions to avoid as far as possible the presence of water. There is firstly prepared the almost anhydrous methanol; the water content of the latter is brought to a value comprised between 60 and 80 ppm, by means of passage over an artificial zeolite column, the starting methanol being commercial methanol previously doubly distilled, (the estimations of water are effected by the Karl Fischer method). The solutions of copper sulphate, of ammonia and soda are prepared from the methanol alcohol thus obtained, protected from air in sealed containers.

The methyl solutions of copper sulphate are prepared from commercial cupric sulphate; the latter crystallises with five molecules of water, which it is first necessary to eliminate. To do this the finely ground crystals, are brought to 150°C for 2 days, at a pressure of $10^{-5}$ torr; the white powder of dehydrated $CuSO_4$, thus obtained, is then energetically shaken with anhydrous methanol in a sealed container. The cupric sulphate being little soluble in methanol, solution is accelerated by heating the container in a bath at 70°C. The operation is conducted in a sealed container 1, of the reactor type shown in FIG. 1 and of which the cover 2 comprises sealed passages for a rotary stirrer 3, a reflux cooler 4 of which the upper end is provided with a trap 5 containing a molecular sieve to prevent the entry into the apparatus of atmospheric water vapor, and a tube 6 connected to a source (not shown) of nitrogen through a trap 7 similar to the trap 5. The body of the reactor comprises a sealed passage for a syphon 8 with a sintered nozzle 8a opening in a flask 9 itself connected to the atmosphere through a trap 10.

The reactor 1 is placed in a water bath 11. After solution, the excess of copper sulphate precipitates as a sediment, the cooled solution is collected in a flask 9 by means of the syphon 8 with a sintered nozzle 8a and by exerting on the surface of the liquid a slight excess pressure of nitrogen.

The solutions of $CuSO_4$ in the methanol thus prepared contain at the maximum 0.05 mole $CuSO_4$ approximately per liter. Their content of water is comprised between 80 and 150 ppm.

The preparation of the ammonia solutions does not lead to particular difficulties, $NH_3$ being very soluble in methanol. Solutions titrating from 0.5 to 6 moles of $NH_3$ per liter can easily be prepared by making ammonia gas bubble slowly therethrough, previously dried by a passage on zeolite, in a sealed container containing anhydrous methanol. The water content of these solutions varies between 60 and 100 ppm. Their content of ammonia does not change if they are preserved in the refridgerator.

The methyl solutions of soda are obtained from pastilles of fused soda. The soda pastilles are kept in the oven for four hours at 500°–600°C in a nickel or platinum crucible. After cooling in a desicator in the presence of zeolite, the crucible and its contents are rapidly placed in a sealed container containing anhydrous methanol, and the whole is energetically shaken for several hours, at embient temperature. The alkaline solution is then filtered (in the same way as the $CuSO_4$ solution) and syphoned into a container containing the molecular sieve in the proportion of 100 g per liter of solution. The end of 24 hours, the solution is again filtered and syphoned into a sealed container. The alkaline solutions obtained in this manner do not contain more than 80 to 160 ppm of water for soda contents varying between 0.1 and 1.5 moles per liter.

All these solutions are used rapidly after their preparation, their content of solute and their content of water are measured directly before use.

There is then prepared the solution of cupritetrammoniakate hydroxide in the following manner by having recourse to the apparatus of FIG. 2, for example.

This apparatus comprises a reactor 1 similar to that shown in FIG. 1 and is connected like the latter, on the one hand, to a source of nitrogen and, on the other hand, to a flask 9. The common elements between the FIGS. 1 and 2 are referenced by the same reference numerals. In the sealed passages of the cover 2 of the ractor, there are adapted as shown in FIG. 2, a device 12 for the introduction of the methanol solution of $NH_3$ and a device 13 for the introduction of the methanol solution of NaOH.

The devices 12 and 13 are in the general shape of tubes respectively 14 and 15, closed at their lower end by valves respectively 16 and 17 capable of being controlled by manipulating the pressures established inside the tubes 14 and 15 on the one hand, and inside the reactor 1 on the other hand, the tubes being connected to the inside of the reactor 1 by tubes 18 and 19 respectively, opening above the solutions contained in the tubes.

A magnetic stirrer 20 is provided in the reactor 1.

To a known amount of cupric sulphate solution is added slowly a large amount of ammonia solution, corresponding in all to 70 to 80 moles of $NH_3$ for 1 mole of $CuSO_4$. A complex salt of violet color and of formula $Cu(NH_3)_4SO_4$, is precipitated. This precipitate and the supernatant liquid are then vigorously stirred during the addition of a methanol solution of soda, in a proportion of 7 to 8 moles of NaOH in all for 1 mole of $CuSO_4$. The liquid then takes a limpid deep blue color, whilst the violet precipitate is replaced by a white and voluminous precipitate, which sediments rather slowly. The copper then passes back into alcoholic solution in the form of the soluble complex $Cu(NH_3)_4(OH)_2$, whilst the sodium sulphate practically insoluble in methanol, remains in the form of a white precipitate:

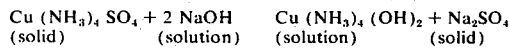

| $Cu(NH_3)_4 SO_4 + 2 NaOH$ | $Cu(NH_3)_4 (OH)_2 + Na_2SO_4$ |
| (solid) (solution) | (solution) (solid) |

The reaction only goes well under the conditions indicated in the above paragraph. If the proportions are not respected, the copper does not pass into solution and the precipitate obtained is a mixture of hydroxide and sulphate of copper and of sodium sulphate.

All the operations are carried out protected from atmospheric water vapor inside the abovesaid reactor 1 which has been described above with reference to FIG. 2.

The last stage of the first object of the invention is then started, namely the precipitation of copper hydroxide $Cu(OH)_2$, this precipitation being effectuable in the presence or not of an inert support, especially alumina, as the catalyst support.

The soluble tetrammoniakate complex $Cu(NH_3)_4(OH)_2$ is decomposed by boiling the ammoniacal solution under reduced pressure. This operation can be effected in an anhydrous atmosphere by means of the apparatus shown in FIG. 3.

This apparatus comprises a reactor 20 provided with a cover 21 in which are provided sealed passages for a stirrer 22, a capillary 23 connected to a source of nitrogen not shown by means of a water trap 24, a tube 25 connected to a vacuum pump 26 through an assembly of means for the protection of the pump and the elimination of ammonia and methanol vapors, which assembly of means will be considered below.

In the reactor 20, the solution is energetically shaken and the temperature kept between 5 and 21°C by means of a water bath not shown, the pressure being from 40 to 100 torr and measured by means of a mercury manometer 30. This pressure is obtained by creating, on the one hand, a vacuum by a blank pump 26 and by introducing, on the other hand, a stream of dry nitrogen bubbled into the liquid by means of the capillary tube 23.

The means provided between the reactor 20 and the pump 26 comprises firstly a trap 27 cooled between 0 and −10°C which condenses the major portion of the methanol evaporated, whilst the ammonia is neutralised subsequently in a washing bath 28 containing concentrated sulphuric acid (5 to 6 N) kept also at −10°C.

The flask 28 contains water and is isolated from the first portion of the apparatus by a drying column 29 of molecular sieve. Finally, a trap 31 cooled by liquid nitrogen protects the pump 26 from any entry of alcohol, water or ammonia.

Once all the ammonia has been removed, the precipitate of copper hydroxide obtained is filtered, washed with anhydrous methanol until the disappearance of all traces of sulphate or ammonia ions in the washing alcohol and dried in air at ambient temperature. A last washing with ether can be effectd to accelerate drying.

The properties of the copper hydroxide thus obtained are indicated below and correspond to the criteria of purity obtained for its use as active catalyst principle.

Formula: $Cu(OH)_2 \cdot m\ H_2O$ ($0.2 < m < 4$). The number m is practically proportional to the amount of water present as impurity in the methanol solution of $Cu(NH_3)_4(OH)_2$ from which the hydroxide is precipitated.

Purity:
Sodium: 150–200 ppm
Sulphate: <500 ppm
$NH_3$: not titratable
Carbon: 60–150 ppm
Structure:
Amorphous solid (less than 5% of crystalline phase).
Granulometry:
Homogeneous (particles of 3 to 8 microns.)
Stability:

Left in air, these compounds tend to eliminate spontaneously, but very slowly, the m molecules of water of addition that they contain. Apart from this, they are more stable than those prepared in aqueous solution.

Temperature at the beginning of sintering under $10^{-6}$ torr: 150°C approximately.

To prepare a catalyst based on divided copper on an inert support by means of the abovesaid hydroxide, benefit can advantageously be drawn from the method of preparation of this hydroxide by introducing in the last stage of preparation the desired amount of the pulverulent inert support. There is dispersed by means of vigorous agitation the support, especially alumina, in the methanol solution of $Cu(NH_3)_4(OH)_2$, then it is brought to boiling under reduced pressure. All the copper hydroxide then precipitates on the particles of the support as is shown by observation under the microscope.

After filtration and drying, the powder obtained is subjected to the combined action of vacuum ($10^{-6}$ torr) and heat, without exceeding the temperature at the beginning of sintering the cupric hydroxide, namely 145°–148°C. The hydroxide deposited is then dehydrated in the proportion of 60 to 85%.

Finally the solid is subjected to the action of a current of pure hydrogen at 180°–190°C. There are thus obtained catalysts constituted of finely divided metallic copper, deposited on the particles of the selected support.

Tests of the activity of the catalysts thus obtained (Cu on $Al_2O_3$) have been effected in the course of dehydrogenation reactions of secondary butanol and isopropanol. The results are assembled in the table below.

| CATALYSTS | | | | REACTIONS CATALYSED | | | | | | | | |
|---|---|---|---|---|---|---|---|---|---|---|---|---|
| | | | | Dehydrogenation of secondary butanol (vapor phase) | | | | | Dehydrogenation of isopropanol (vapor phase) | | | |
| Support (nature and specific surface) | % of copper prepared in alcoholic medium | Metallic surface (in $m^2/g$ of Cu) | Degree of dispersion of the copper (1) | Temperature °C | Flow-rate of alcohol in g/hour g of catalyst | Proportion of overall conversion | Proportion of conversion into methyl-ethyl-ketone | Secondary products of the reaction | Temperature °C | Flow-rate of alcohol in g/hour g of catalyst | Proportion of overall conversion | Proportion of conversion into acetone | Secondary Products |
| Porous amorphous alumina 110m²/g | 3.17% | 93.2 | 1/6 | 150 | 1.1 | 97.1 | 94.6% | Possibly 2-butene (cis- and trans-), ethylene, ethane and methane | 150 | 0.8 | 98.2% | 95.7% | |
| Porous amorphous alumina 110m²/g | 5.62% | 85.4 | 1/6.5 | 120 | 1.1 | 92.6 | 91.2% | | 150 | 0.8 | 96.9% | 95.3% | Essentially propene and lower hydrocarbons |
| | | | | 150 | 1.1 | 96.4 | 94.8% | | | | | | |
| | | | | 120 | 1.1 | 95.8 | 95.4% | | | | | | |
| Non porous δ-$Al_2O_3$ 100m²/g | 3.51% | 70.3 | 1/8 | 150 | 1.1 | 99.7 | 99.3% | | 150 | 0.8 | 99.8% | 99.4% | |
| Non porous δ-$Al_2O_3$ 100m²/g | 1.73% | 99.5 | 1/5.5 | 120 | 1.1 | 98.5 | 98.0% | | 150 | 0.8 | ≃100% | 99.7% | |
| | | | | 150 | 1.1 | ≃100 | 99.8% | | | | | | |

(1) Ratio of the number of Cu atom in surface/total number of Cu atoms

| Decomposition temperature under vacuum ($10^{-6}$ torr) | Composition of the product obtained | Specific surface ($m^2/g$) |
|---|---|---|
| — | $Cu(OH)_2 \cdot m\ H_2O$ | 30–50 |
| 93°C | $Cu(OH)_2$ | 35–60 |
| 132°C | $CuO \cdot 0.5\ H_2O$ | 38–66 |
| 150°C | $CuO \cdot 0.1\ H_2O$ | 40–70 |
| 280°C | $CuO \cdot 0.1\ H_2O$ | 12–18 |
| 380°C | $CuO$ | 10–15 |

The catalysts thus prepared have, with respect to the usual dehydrogenation catalysts for alcohols, the advantage of combining high catalytic activity (conversion ratio very close to or equal to 100%), due to the very finely divided state of the metal, and a selective power very close or equal to 1 due to the fact that the copper is the only active principle of the catalyst, no addition of activator having been made for the purpose of obtaining high activity.

An example of the high activity of these catalysts is provided below. Zinc oxide is a typical catlyst for the dehydrogenation of alcohol. With this catalyst, the speed of dehydrogenation of isopropyl alcohol in acetone at 200°C in the vapor phase, with respect to 1 m² of active surface, is about $2.10^{-6}$ moles/second. The catalysts of which the preparation is described above, produce, for the same reaction effected under the same conditions, speeds varying from $1.5.10^{-6}$ to $4.10^{-6}$ moles/second/m² of active surface.

As a result of which and whatever the embodiment adopted there is provided a method for the preparation of copper hydroxide and of a catalyst obtained from this hydroxide, whose characteristics and advantages emerge sufficiently from the foregoing for it to be unnecessary to dwell further on this subject.

As is self-evident and as emerges already from the foregoing, the invention is in no way limited to those of its types of application and embodiments which have been more especially envisaged; it encompasses, on the contrary, all modifications.

We claim:

1. A method for the preparation of copper hydroxide comprising reacting under anhydrous conditions an inorganic salt of copper with ammonia in the presence of a lower alkanol solvent for said inorganic salt of copper to form a complex of said ammonia and said inorganic salt of copper, introducing into the reaction medium at least one alkali metal hydroxide and finally decomposing under vacuum said complex into copper hydroxide.

2. A method for the preparation of copper hydroxide comprising dissolving under anhydrous conditions copper sulphate and ammonia in a solvent selected from the group consisting of methanol, ethanol and propanol, taking up the resulting product of the reaction of copper sulphate and ammonia in a methanol solution of anhydrous sodium hydroxide, separating the sodium sulphate precipitate and driving off the ammonia from the soluble tetrammoniakate copper hydroxide complex formed by boiling under pressure of 40 to 100 torr at a temperature of 5° to 21° celsius, filtering, washing and drying the copper hydroxide formed.

3. Method according to claim 2, wherein said solvent is methanol.

4. A method for the preparation of a copper on alumina catalyst precursor comprised of copper hydroxide or an inert pulverulent alumina support which method comprises dissolving under anhydrous conditions copper sulphate and ammonia in a solvent selected from the group consisting of methanol, ethanol and propanol, taking up the product of the reaction of the copper sulphate solution with a large amount of the ammonia solution by a methanol solution of sodium hydroxide, separating the precipitate of sodium sulphate and driving off the ammonia from the soluble copper tetrammoniakate hydroxide complex formed by boiling under a pressure of 40 to 100 torr at a temperature of 5° to 21° celcius in the presence of a dispersion of said inert pulverulent alumina support, filtering, washing and drying the catalyst precursor thus obtained and dehydrating the deposited copper hydroxide under the combined action of vacuum and heat without exceeding the temperature at which copper hydroxide begins to sinter.

5. A method according to claim 4 wherein the copper hydroxide on said alumina support is heated in the presence of hydrogen to reduce the copper hydroxide to metallic copper.

6. Method for obtaining a catalyst on an inert support according to claim 4, comprising using as the inert support porous amorphous alumina or nonporous alumina.

7. Method according to claim 4, wherein said solvent is methanol.

* * * * *